United States Patent
De Oliveira Kastrup Pereira et al.

(10) Patent No.: US 7,559,051 B2
(45) Date of Patent: Jul. 7, 2009

(54) SOURCE-TO-SOURCE PARTITIONING COMPILATION

(75) Inventors: Bernardo De Oliveira Kastrup Pereira, Eindhoven (NL); Alexander Augusteijn, Eindhoven (NL); Orlando Miguel Pires Dos Reis Moreira, Eindhoven (NL); Paul A. C. J. Van Loon, Eindhoven (NL)

(73) Assignee: Silicon Hive B.V., Eindhoven (NL)

( * ) Notice: Subject to any disclaimer, the term of this patent is extended or adjusted under 35 U.S.C. 154(b) by 581 days.

(21) Appl. No.: 10/522,083

(22) PCT Filed: Jun. 23, 2003

(86) PCT No.: PCT/IB03/02908

§ 371 (c)(1), (2), (4) Date: Jan. 21, 2005

(87) PCT Pub. No.: WO2004/012083

PCT Pub. Date: Feb. 5, 2004

(65) Prior Publication Data

US 2005/0246680 A1 Nov. 3, 2005

(30) Foreign Application Priority Data

Jul. 25, 2002 (EP) .................................. 02078038

(51) Int. Cl.
*G06F 9/44* (2006.01)
(52) U.S. Cl. ........................................................ 717/112
(58) Field of Classification Search ................. 717/112, 717/121, 131, 132, 140–145, 149, 154–157
See application file for complete search history.

(56) References Cited

U.S. PATENT DOCUMENTS

| 5,276,880 | A | * | 1/1994 | Platoff et al. | ................. 717/143 |
| 5,555,417 | A | * | 9/1996 | Odnert et al. | ................ 717/159 |
| 5,748,489 | A | * | 5/1998 | Beatty et al. | .................... 716/7 |
| 5,848,262 | A | * | 12/1998 | Burch | .......................... 703/13 |

(Continued)

OTHER PUBLICATIONS

Erik Stoy, et al. "Inter-Domain Movement of Functionality as a Repartitioning Strategy for Hardware/Software Co-Design", IDA Technical Report 1995, pp. 1-11, from internet search on Oct. 23, 2007.*

(Continued)

*Primary Examiner*—Wei Y Zhen
*Assistant Examiner*—Anna Deng
(74) *Attorney, Agent, or Firm*—Leydig, Voit & Mayer Ltd.

(57) ABSTRACT

A method is disclosed for partitioning a specification in a source code. In a first step, the specification is converted into a plurality of abstract syntax trees. In a second step, the plurality of abstract syntax trees is partitioned into at least a first set and a second set. The first set of abstract syntax trees is to be implemented by a first processor and the second set of abstract syntax trees is to be implemented by a second processor. The first and second set of abstracts syntax trees are translated to a specification in the original source code language, respectively, allowing the user to add manual changes to the specifications. Furthermore, specific compiler and design tools are used to convert the specifications into corresponding executable machine code and a specification of the co-processor.

16 Claims, 7 Drawing Sheets

U.S. PATENT DOCUMENTS

| | | | |
|---|---|---|---|
| 5,896,537 A * | 4/1999 | Landi et al. | 717/132 |
| 6,061,513 A * | 5/2000 | Scandura | 717/142 |
| 6,257,774 B1 * | 7/2001 | Stack | 717/110 |
| 6,307,877 B1 * | 10/2001 | Philips et al. | 375/130 |
| 6,728,950 B2 * | 4/2004 | Davis et al. | 717/136 |
| 6,839,895 B1 * | 1/2005 | Ju et al. | 717/159 |
| 6,857,102 B1 * | 2/2005 | Bickmore et al. | 715/205 |
| 7,062,762 B2 * | 6/2006 | Krishnamurthy et al. | 717/156 |
| 7,085,918 B2 * | 8/2006 | Sharangpani et al. | 712/217 |
| 7,143,392 B2 * | 11/2006 | Ii et al. | 717/125 |
| 7,150,011 B2 * | 12/2006 | Ha et al. | 717/148 |
| 7,174,536 B1 * | 2/2007 | Kothari et al. | 717/109 |
| 7,343,594 B1 * | 3/2008 | Metzgen | 717/140 |
| 2003/0037319 A1 * | 2/2003 | Narang | 717/144 |
| 2003/0140337 A1 * | 7/2003 | Aubury | 717/158 |
| 2003/0188300 A1 * | 10/2003 | Patrudu | 717/149 |
| 2004/0015816 A1 * | 1/2004 | Hines et al. | 717/101 |

OTHER PUBLICATIONS

Jay Adams, et al. "Multiple-Process Behavioral Synthesis for Mixed hardware-Software System", Sep. 1995, ACM Press, pp. 1-6.*
Potkonjak, et al. "A methodology and algorithms for the design of hard real-time multitasking ASICs", Oct. 1999, ACM, TODAES, vol. 4, Issue 4, pp. 430-459.*

* cited by examiner

SOURCE-TO-SOURCE PARTITIONING COMPILATION

TECHNICAL FIELD

The present invention relates to a method for partitioning a specification in a source code.

The present invention further relates to a co-design method for producing a target system, wherein the target system comprises a first processor and at least a second processor, the co-design method comprising said method for partitioning a specification in a source code.

The present invention further relates to a partitioning compiler program product being arranged for implementing all the steps of said method for partitioning a specification in a source code when said partitioning compiler program is run on a computer system.

BACKGROUND ART

Target systems comprising two or more processors allow combining flexibility and speed for execution of a set of functions. An example of such a target system is a system having two or more co-processors for executing an application under control of a control processor. Another example is a system having a general-purpose processor and a co-processor, both executing a part of the application. A general-purpose processor is software controlled and can be adapted to many different desired purposes by the use of suitable software, providing a great flexibility. However, for a given function, a software-controlled processor is usually slower than a co-processor dedicated to that function. Examples of co-processors are fixed hardware accelerators, parametrizable hardware accelerators, reconfigurable hardware, application-specific instruction set processors and specialized programmable processors used as accelerators. When using a co-processor, the speed of operation is increased at the expense of flexibility. Furthermore, the use of a co-processor increases the power efficiency of the target system. The co-processor is suitable for the task for which it was designed, but it may not be suitable for a modified version of that task. However, defining a co-processor on a reconfigurable circuit, such as a Field Programmable Gate Array (FPGA), can increase the flexibility of the hardware. Such a logic circuit can be repeatedly configured in different ways.

For target systems comprising both a general-purpose processor and a co-processor, the co-processor is used to execute particular functions, e.g. those requiring speed, and the general-purpose processor can perform the remaining functions under control of the software. The design of such target systems is known as hardware/software co-design. Within the design process, it must be decided, for a target system with a desired functionality, which functions are to be performed by the co-processor and which in software. This is known as hardware/software partitioning. After partitioning the specification of the desired functionality into a part to be implemented in software and a part to be implemented by a co-processor, the actual implementation has to be performed. A compiler converts the part to be implemented in software into machine code to be executed by the general-purpose processor, and for example a hardware synthesis tool configures the hardware or generates a netlist, as defined by its part of the specification.

For other target systems comprising a control processor and two or more co-processors, the co-processors are used to execute the application and the control processor controls the target system, for example handles the operating system and the user interface. The co-processors may be dedicated to efficiently handle a particular set of functions. When designing such a target system a co-design method is applied as well, for determining which functions are executed by a particular co-processor. The specification is partitioned at least into a part to be implemented by a first co-processor and a part to be implemented by a second co-processor.

WO 00/38087 describes a co-design system for making an electronic circuit that includes both a co-processor and software controlled resources. The co-design system receives a behavioral description of the target electronic system and automatically partitions the required functionality between hardware and software. The partitioner generates a control/data-flow graph from an abstract syntax tree. It then operates on the parts of the description that have not already been assigned to resources by the user.

It is a disadvantage of the prior art co-design method that, once the partitioning of the specification has been made, it is not possible to convert the hardware part and/or the software part back to the original source code of the specification. This results in two serious drawbacks. The first is that after partitioning it is practically impossible for the user to make any manual changes to the partitioned specification. This may be very useful in practice to improve the performance of the target system, e.g. by manually transferring additional functionality to a particular co-processor. Secondly, in case of hardware/software co-design, the software compilation and hardware synthesis will have to be performed on the obtained control/data-flow graph representation, meaning that these steps will have to be performed by the same tool used for hardware/software partitioning. In practice, this tool may not generate the most efficient machine code and/or hardware configuration. The use of a compiler specific for the general-purpose processor as well as a design tool and/or compiler specific for the co-processor allows obtaining an optimal performance for the target system. Similar problems are encountered during co-design of a system having a control processor and two or more co-processors for executing an application. In this case the use of dedicated tools for designing the co-processors allows making an optimal design of the target system as well.

DISCLOSURE OF INVENTION

An object of the invention is to provide a partitioning method of a specification that, after partitioning, allows conversion of both the part to be implemented by a first processor into a specification in a source code language as well as conversion of the part to be implemented by a second processor into a specification in a source code language.

This object is achieved with a method for partitioning a specification in a source code, characterized in that the method comprises the following steps: converting the specification into a plurality of abstract syntax trees, partitioning the plurality of abstract syntax trees into at least a first set and a second set, the first set of abstract syntax trees to be implemented by a first processor and the second set of abstract syntax trees to be implemented by a second processor.

The partitioning method operates on a plurality of abstract syntax trees that is a representation of the source program. A specification represented in the form of an abstract syntax tree can be translated back to a specification in a source code language. Therefore, after partitioning, such a translation can be made for the part to be implemented by the first processor as well as the part to be implemented by the second processor.

An embodiment of the invention is characterized in that the method for partitioning further comprises the following step:

converting the first set of abstract syntax trees to a first partial specification in the source code and converting the second set of abstract syntax trees to a second partial specification in the source code. An advantage of this embodiment is that it greatly facilitates the user to add manual changes to the first and to the second partial specification. Another advantage of this embodiment is that a specific compiler and a specific design tool can be used for implementing the first and second partial specification by the first processor and the second processor, respectively.

An embodiment of the invention is characterized in that the step of partitioning the plurality of abstract syntax trees into a first set of abstract syntax trees and a second set of abstract syntax trees comprises a step of out-lining at least one abstract syntax tree based on profile data. An advantage of this embodiment is that it allows transferring the critical part of the specification to the part to be executed by the co-processor, by providing information for recognizing this critical part. Furthermore, it allows automating the hardware/software partitioning by using the profile data as input data for a partitioning compiler program.

An embodiment of the invention is to provide a co-design method for producing a target system, wherein the target system comprises a first processor and at least a second processor, the co-design method comprising the method for partitioning according to claim 1. An advantage of this embodiment is that manual changes to the partitioned specification can easily be made, since this partitioned specification can be converted to the original source code language. For example, manually transferring additional functionality from the part to be implemented by a first processor to the part to be implemented by the second processor, or vice versa. Furthermore, when designing the target system, both a compiler program specific for a general-purpose processor as well as a design tool and/or compiler specific for a co-processor can be used. As a result, an optimal performance for the target system can be obtained.

An embodiment of the invention is characterized in that the second processor is a co-processor and wherein the second partial specification is converted to a specification of a co-processor. An embodiment of the invention is characterized in that the first processor is a general-purpose processor and wherein the first partial specification is converted to object code by means of a compiler. Target systems comprising a general-purpose processor and a co-processor allow combining the flexibility of a general-purpose processor and the high performance of a co-processor.

An embodiment of the invention is characterized in that the co-design method further comprises a step for defining an interface between the general-purpose processor and the co-processor. An advantage of this embodiment is that it allows exchanging information between the general-purpose processor and the co-processor, for example for synchronization purposes or exchanging references for reading and writing data.

An embodiment of the invention is characterized in that the interface between the general-purpose processor and the co-processor comprises a remote function call; the remote function call having a set of parameters; the set of parameters comprising an identifier for the function to be called, at least one reference pointing to the input data of the function to be called and at least one reference pointing to the result data of the function to be called. An advantage of this embodiment is that the remote function call allows synchronizing the general-purpose processor and the co-processor, and transferring references for input data as well as result data.

An embodiment of the invention is characterized in that the set of parameters of the remote function call further comprises a reference to a memory location used for storing information on the return status of the function to be called. In case the function to be executed by the co-processor has more than one point of exit, information on the actual point of exit has to be made available to the general-purpose processor for determining at which point in the software it has to restart its execution. By using a reference to a memory location used for storing information on the return status of the function executed by the co-processor, the general-purpose processor has access to this information.

An embodiment is characterized in that the general-purpose processor is a digital signal processor. Digital signal processors typically deal with applications in which a relatively small part of the specification determines the overall execution time. By executing this part of the application using a co-processor the overall performance can be increased.

According to the invention, a partitioning compiler program product is arranged for implementing all the steps of the method for partitioning according to claim 1 when said partitioning compiler program is run on a computer system. An advantage of this product is that it allows automating the partitioning, and thus increasing the efficiency.

BRIEF DESCRIPTION OF THE DRAWINGS

The features of the described embodiments will be further elucidated and described with reference to the drawings.

DESCRIPTION OF PREFERRED EMBODIMENTS

In a first embodiment of a method of partitioning according to the invention, the user has written a program in C as a source code language, that should be partitioned in a first part to be implemented by a general-purpose processor and a second part to be implemented by a co-processor. By way of example, a fragment of the source code of the C program consists of three functions f, g and h, each having an integer as input parameter and two arbitrary statements that should be executed:

```
f (int x)
{
        s1;
        s2;
}
g (int y)
{
        s3;
```

```
            s4;
}
h (int z)
{
            s5;
            s6;
}
```

Figure 1:
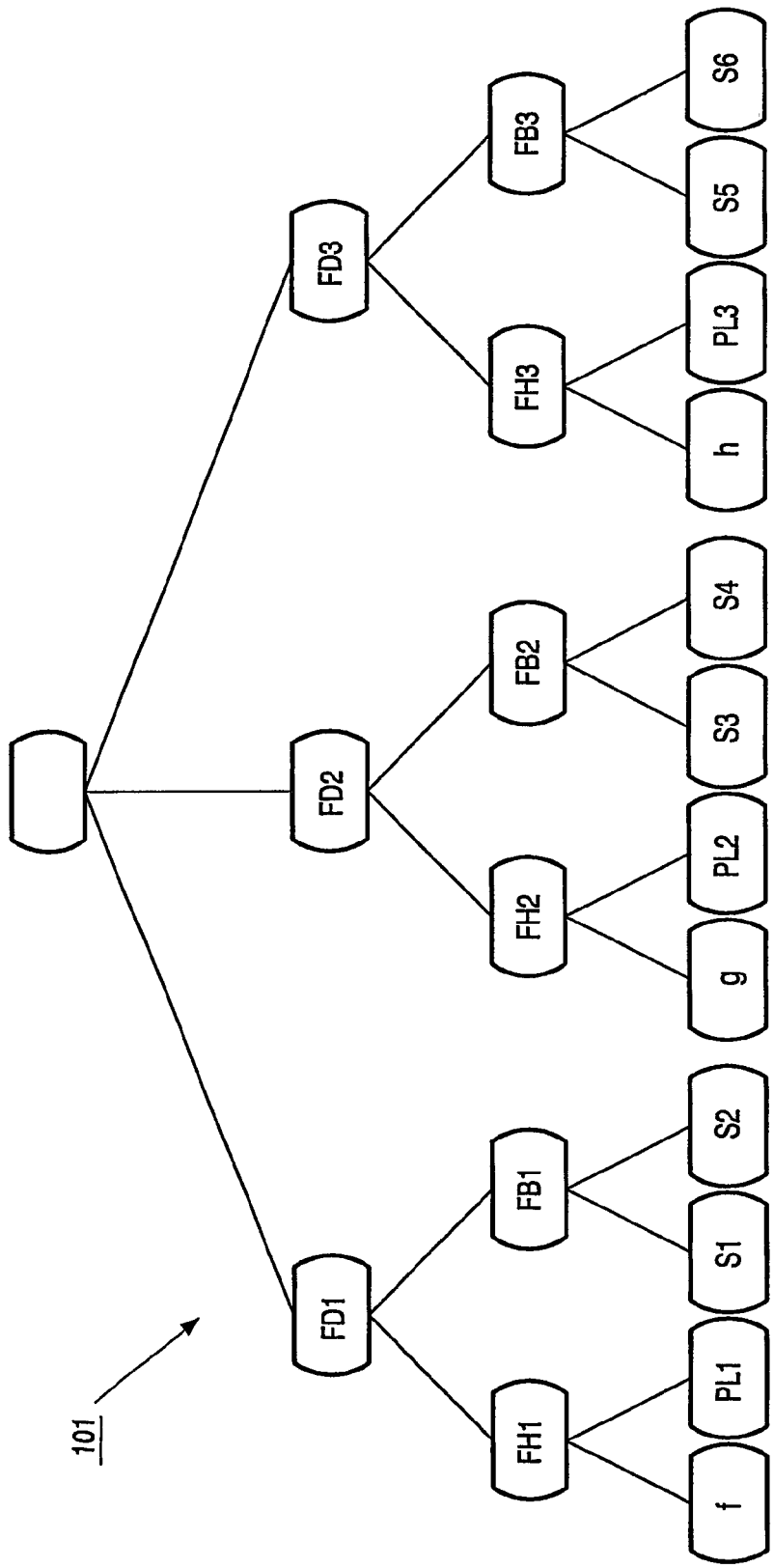
FIG. 1 shows a plurality of abstract syntax trees obtained after scanning and parsing a source code fragment.

The method of partitioning is shown using above mentioned source code fragment. In a first step, the source code is translated to a plurality of Abstract Syntax Trees (AST). A plurality of abstract syntax trees represents the internal structure of a source code in abstract syntax by using a tree as data structure. An AST has nodes that are labeled with the production names, and leaves that represent the terminals in the grammar. The translation of a source code into a plurality of abstract syntax trees can be done by means of a parser, which obtains its input from a scanner, and subsequently constructs the plurality of abstract syntax trees. Both the techniques of scanning and consequently parsing of a source code are known principles from the field of compiler technology. The resulting plurality of abstract syntax trees 101 of the source code fragment comprising functions f, g and h is shown in FIG. 1. In FIG. 1, three abstract syntax trees are shown with nodes FD1, FD2 and FD3, referring to function f, g, and h of the source code fragment, respectively. The abbreviation FD refers to function definition, FH to function header, FB to function body and PL to parameter list. These abbreviations are followed by a reference number. The parameter lists PL1, PL2 and PL3 are not further specified.

In a second step, the plurality of abstract syntax trees 101 is partitioned into a first and a second set. The first set of abstract syntax trees is to be implemented by a general-purpose processor and the second set of abstract syntax trees is to be implemented by a co-processor. The abstract syntax trees to be implemented by the co-processor are selected to be transferred to the second set of abstract syntax trees. The selected abstract syntax trees may correspond to a specific function or a specific statement in the source code fragment comprising functions f, g and h. The process of transferring specific abstract syntax trees from the plurality of abstract syntax trees 101 to the second set of abstract syntax trees is referred to as out-lining. When out-lining an abstract syntax tree, corresponding to either a statement or a function called by another function, it is replaced by a new abstract syntax tree in the first set corresponding to a function which calls either the transferred statement or function. In case the transferred statement or function has variables, these variables are passed as arguments to the transferred statement or function.

Referring to FIG. 1, the abstract syntax tree with node FD3 and its branches, corresponding to the function h in the source code fragment, is selected for transfer to the second set of abstract syntax trees. Furthermore, the abstract syntax tree with only leaf s4, corresponding to statement s4 of function g in the source code fragment, is selected for transfer to the second set of abstract syntax trees. Statement s4 uses variable y, not shown in the source code fragment. By out-lining and replacing of abstract syntax trees the plurality of abstract syntax trees 101 is partitioned into a first set 201 and a second set 203 of abstract syntax trees.

Figure 2:
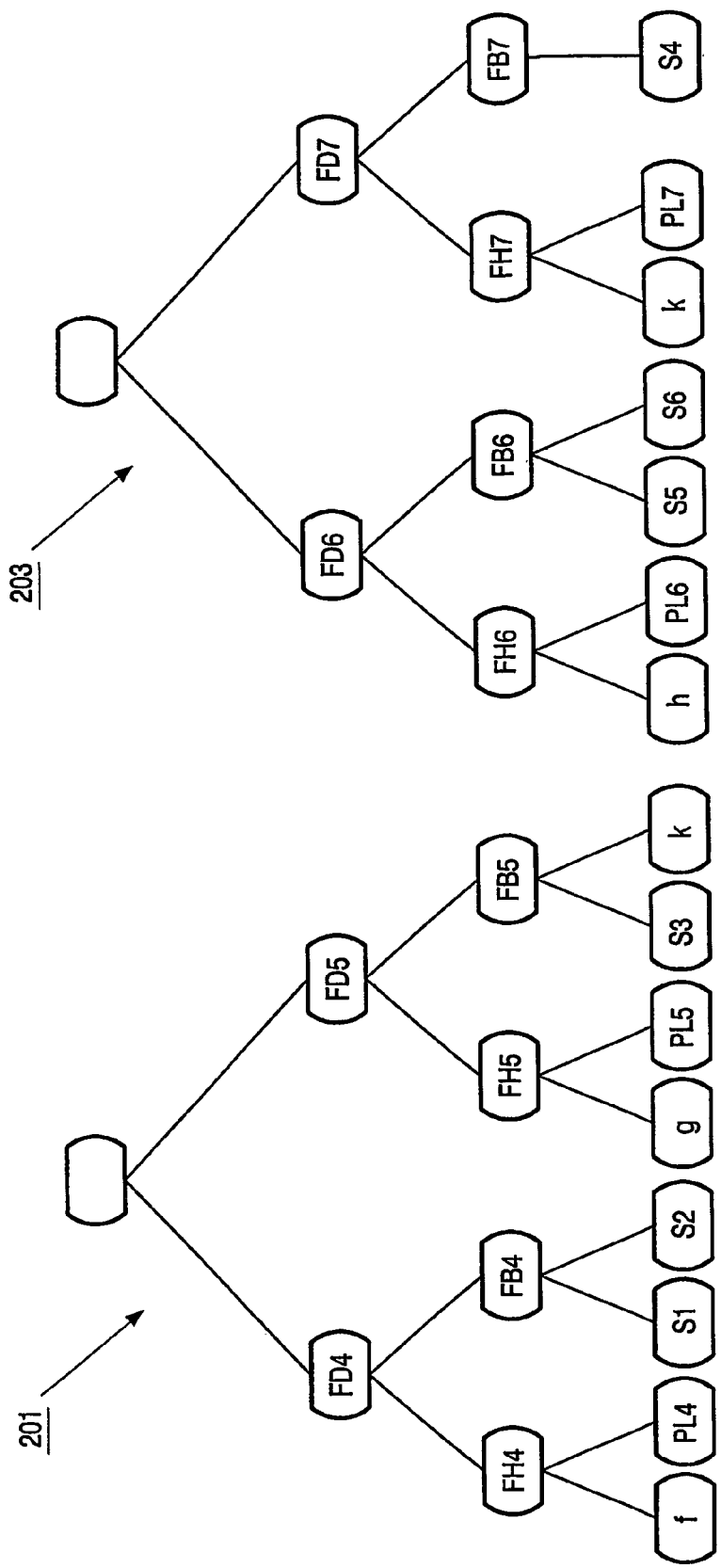
FIG. 2 shows a first and a second set of abstract syntax trees obtained after partitioning the plurality of abstract syntax trees shown in FIG. 1.

Referring to FIG. 2, it shows the first 201 and second set 203 of abstract syntax trees obtained after partitioning of the plurality of abstract syntax trees 101. Out-lining of abstract syntax tree s4 of the plurality of abstract syntax trees 101 is realized by creating a function in the second set of abstract syntax trees 203, corresponding to the abstract syntax tree with node FD7 and its branches. Out-lining of abstract syntax tree s4 in the plurality of abstract syntax trees 101 is followed by replacing abstract syntax tree s4 by a function call to the function k present as abstract syntax tree FD7 in the second set of abstract syntax trees 203. The variable y is passed as an argument to the new function k created in the second set of abstract syntax trees 203. The first set of abstract syntax trees 201 comprises the abstract syntax tree with node FD4 and its branches, corresponding to function f in the source code fragment. It further comprises the abstract syntax tree with node FD5, with abstract syntax tree k in one of its branches. The second set of abstract syntax trees 203 comprises an abstract syntax tree with node FD6 and its branches, corresponding to function h in the source code fragment. It further comprises an abstract syntax tree with node FD7 and its branches, corresponding to statement s4 of function g in the source code fragment.

The abstract syntax trees to be transferred to the second set of abstract syntax trees 203 can be selected by manually marking the corresponding functions or statements in the source code fragment. The user has to make the selection for the functionality to be transferred to the co-processor. This information is added to the plurality of abstract syntax trees 101 when converting the source code fragment into the plurality of abstract syntax trees and this information is subsequently used for partitioning. The first set 201 and the second set 203 of abstract syntax trees can be translated back to a specification in a source code language. All necessary internal information of a source code is still present in an abstract syntax tree representation to allow such a translation. , In some embodiments the specification is partitioned into more than two sets of abstract syntax trees, for example into three sets of abstract syntax trees. The first set is implemented by a general-purpose processor, and the second and third set are implemented by a first and a second co-processor, respectively. An advantage of this embodiment is that it allows defining multiple co-processors, each dedicated for executing a specific part of the specification.

In yet another embodiment, the specification is partitioned into at least two sets of abstracts syntax trees. Each set of the at least two sets is implemented by a co-processor. As a result, a set of co-processors can be defined which efficiently executes the application.

In an advantageous embodiment the first set of abstract syntax trees 201 is converted to a first partial specification in the source code language, and the second set of abstract syntax trees 203 is converted to a second specification in the source code language. When converting the first set of abstract syntax trees 201, the following first partial specification is obtained:

```
            f (int x)
            {
                        s1;
                        s2;
            }
            g (int y)
            {
                        s3;
                        k(y);
            }
```

When converting the second set of abstract syntax trees 203, the following second partial specification is obtained:

```
h (int z)
{
        s5;
        s6;
}
k (int y)
{
        s4;
}
```

The user may add manual changes to the first and second partial specification. Implementing the first and second partial specification in the general-purpose processor and the co-processor, respectively, can be done by means of a specific compiler and a specific design tool and/or compiler.

In another embodiment the step of partitioning the plurality of abstract syntax 101 trees into a first 201 and a second set 203 of abstract syntax trees comprises a step of out-lining at least one abstract syntax tree based on profile data. The critical part of the specification is most obvious to be executed by the co-processor. By running the application as defined by the specification using typical input data, profile data can be obtained. The type of relevant profile data depends, among other things, on the characteristics of the co-processor. For example, if the co-processor is capable of fast executing operations in parallel, the profile data are focused on the number of times an operation is executed and the amount of parallelism it possesses. The profile data are used to select the critical operations in the specification, so that the corresponding abstract syntax trees can be transferred to the second set of abstract syntax trees 203. As a result, the co-processor will implement the critical part of the specification. Furthermore, the use of profile data allows automatic partitioning of the specification into a first and a second partial specification.

Figure 3:
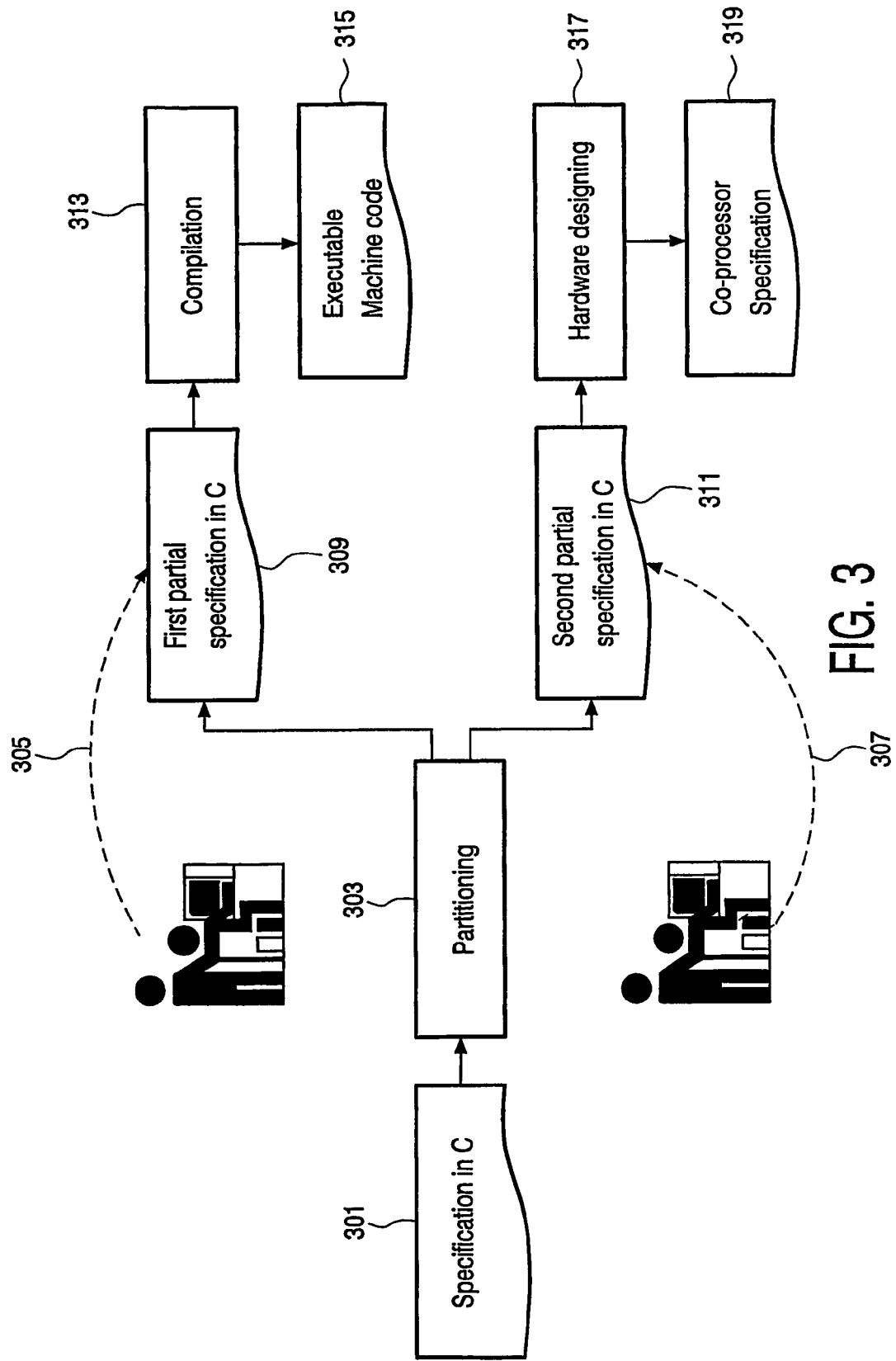
FIG. 3 shows a co-design method according to the invention, for producing a target system.

Referring to FIG. 3, schematically a co-design method is shown for producing a target system. The target system comprises a general-purpose processor and a co-processor. In the first step 303 a specification in the source code language C 301 is partitioned into a first partial specification in C 309 to be implemented by the general-purpose processor and a second partial specification in C 311 to be implemented by the co-processor. This step 303 comprises the method for partitioning a specification in a source code, according to an earlier described embodiment:

conversion of the specification in the source code language C 301 into a plurality of abstracts syntax trees by means of a scanner and a parser.

partitioning the plurality of abstract syntax trees into a first set and a second set of abstract syntax trees, using profile data for identifying the critical operations that should be implemented by the co-processor.

translating the first set of abstract syntax trees to a first partial specification in C 309 and translating the second set of abstract syntax trees to a second partial specification in C 311.

In a next step the user may add manual changes 305 and 307 to the first 309 and second partial specification 311, respectively. For example, functionality can be transferred from the first to the second partial specification, if desired. The fact that these specifications are in the original source code greatly facilitates the user to make any manual changes.

In the following step 313, the first partial specification in C 309 is converted to executable machine code 315, using a specific compiler for the general-purpose processor. In a step 317, which can be executed in parallel with step 313, the second partial specification 311 is converted to a specification of the co-processor 319 using a specific design tool and/or compiler. In some embodiments the specification of the co-processor is a hardware specification, for example in the form of a netlist, for designing an Application Specific IC (ASIC). In other embodiments, the co-processor specification is a hardware design and a configuration specification for a configurable processor, or only a configuration specification, if an already existing configurable processor is used. In some further embodiments, the co-processor specification is a hardware design and a software specification, for example in the form of micro-code or executable machine code, for a programmable processor, or only a software specification if an existing programmable processor is used.

In another embodiment, the target system comprises a control processor as well as a first and a second co-processor. The specification 301 is mapped onto these co-processors. The first partial specification 309 is converted into a specification of the first co-processor, using a specific design tool and/or compiler. The second partial specification 311 is converted into a specification of the second co-processor, using a specific design tool and/or compiler as well.

In a different embodiment, during the first step 303 of the co-design method an interface is defined between the general-purpose processor and the co-processor. This interface can be defined after partitioning in a first 309 and a second 311 partial specification. It may consist of memory addresses for reading and writing of data, as well as reading and writing of control information necessary for the synchronization between the general-purpose processor and the co-processor.

In an advantageous embodiment the interface between the general-purpose processor and the co-processor comprises a remote function call. Via the remote function call, the general-purpose processor calls a function implemented by the co-processor, and resumes execution at the moment the co-processor has finished executing the particular function. Alternatively, the general-purpose processor could switch to a different task in the meantime. By using a remote function call the synchronization between the general-purpose processor and the co-processor is implicitly present. When performing a remote function call, an identifier for the function to be executed by the co-processor is passed as a parameter. Furthermore, the memory addresses for obtaining the input data as well as the memory addresses for writing the result data of the particular functions are passed as parameters of the remote function call. The co-processor can read the input data from and write the output data to a system memory.

In some embodiments also a memory reference used for storing information on the return status of the function executed by the co-processor is passed as a parameter of the remote function call. In case the particular function has more than one point of exit and control is returned to the general-purpose processor after execution of that function, the general-purpose processor has access to information on which point in the software it has to resume its execution. Via this memory reference the general-purpose processor can retrieve the return status of the particular function.

Figure 4:
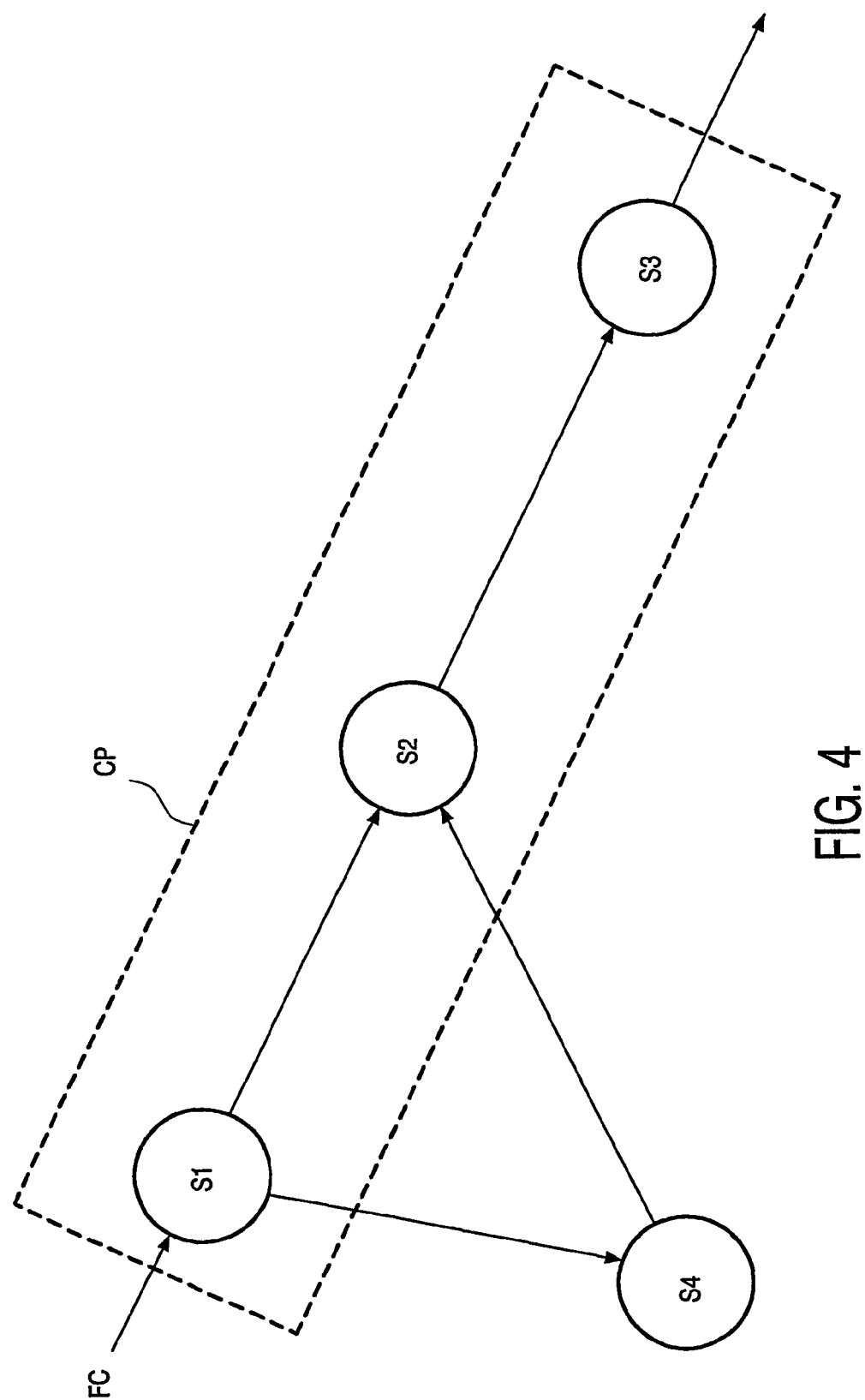
FIG. 4 shows a flow of statement execution through a part of a specification prior to partitioning.
Figure 5:
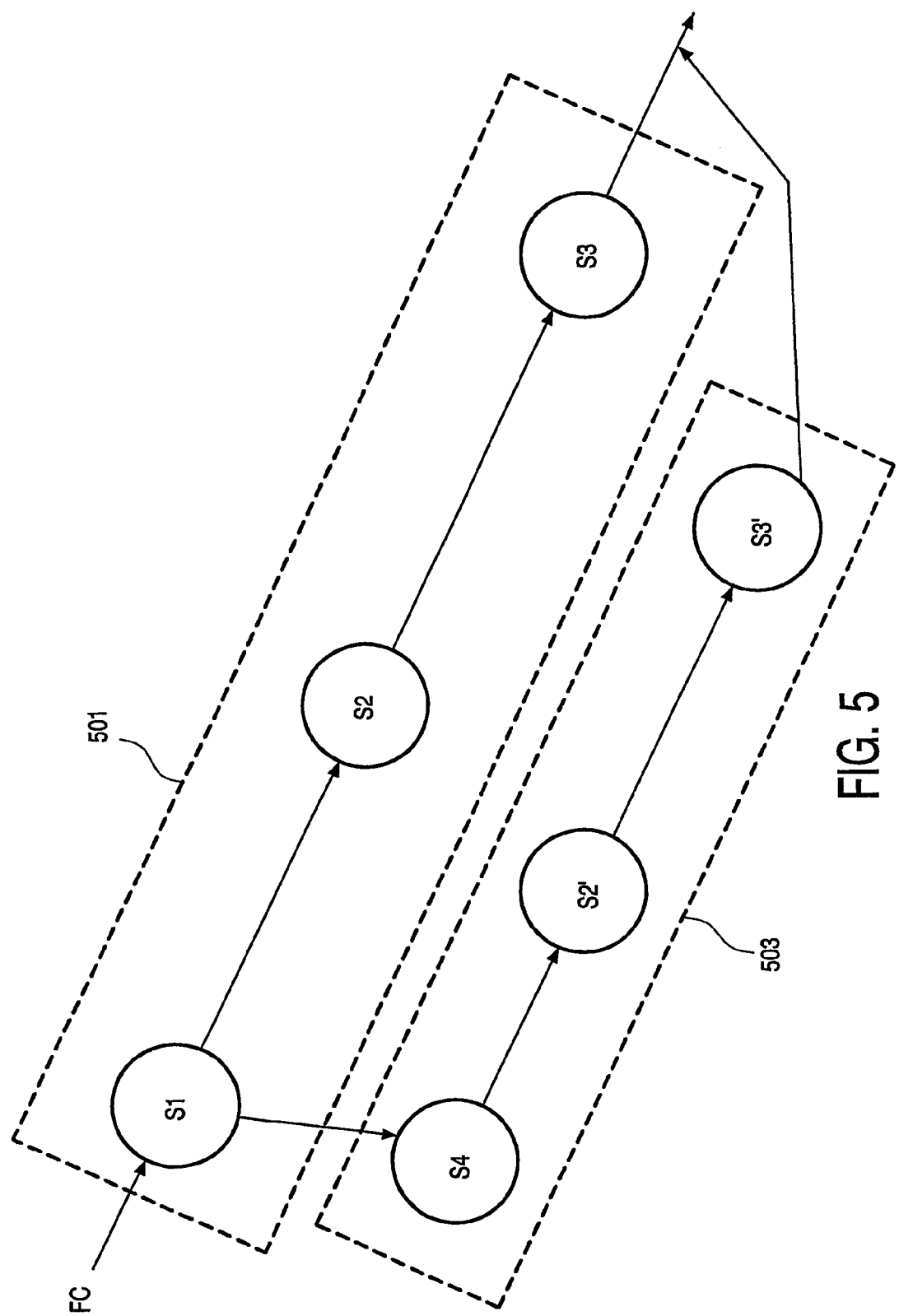
FIG. 5 shows a flow of statement execution after partitioning.

In some embodiments, during the first step 303 of the co-design method functionality transferred to the second set of abstract syntax trees is replicated in the first set of abstract syntax trees. Referring to FIG. 4, schematically the flow of function calls through a part of a specification is shown. At a point of execution, a function call FC is made to statement S1, which contains an if then—else construction. Statement S1 may be followed by statement S4 or statement S2, depending on the outcome of the evaluation of the guard of the if then—else construction. After executing statement S4, statement S2 is executed. Execution of statement S2 is followed by execution of statement S3. Next, statement S3 returns control. The critical path CP comprises statements S1, S2 and S3 and these are in the form of their corresponding abstract syntax trees transferred to the second set of abstract syntax trees. The corresponding abstract syntax tree of statement S1, in the first set of abstract syntax trees, is replaced by a new abstract syntax tree for making a function call to the out-lined statements S1, S2 and S3. During execution, statements S1, S2 and S3 are executed by the co-processor. However, incidentally, statement S1 may be followed by statement S4, and in that case control is returned to the general-purpose processor. In order to reduce the overhead resulting from function calls between the general-purpose processor and the co-processor, statement S2 and S3 are replicated in the first set of abstract syntax trees, by adding their corresponding abstract syntax trees. The resulting flow of statement execution is shown in FIG. 5. Referring to this figure, the replicated statements are shown as statement S2' and statement S3', respectively. The co-processor executes the statements referred to by 501, and the general-purpose processor executes the statements referred to by 503. Statement S3 and statement S3' both have the same point of return, after finishing their execution. The loss of performance in case, incidentally, the statements S2' and S3' have to be executed by the general-purpose processor is outweighed by the gain obtained by the reduced overhead.

Figure 6:
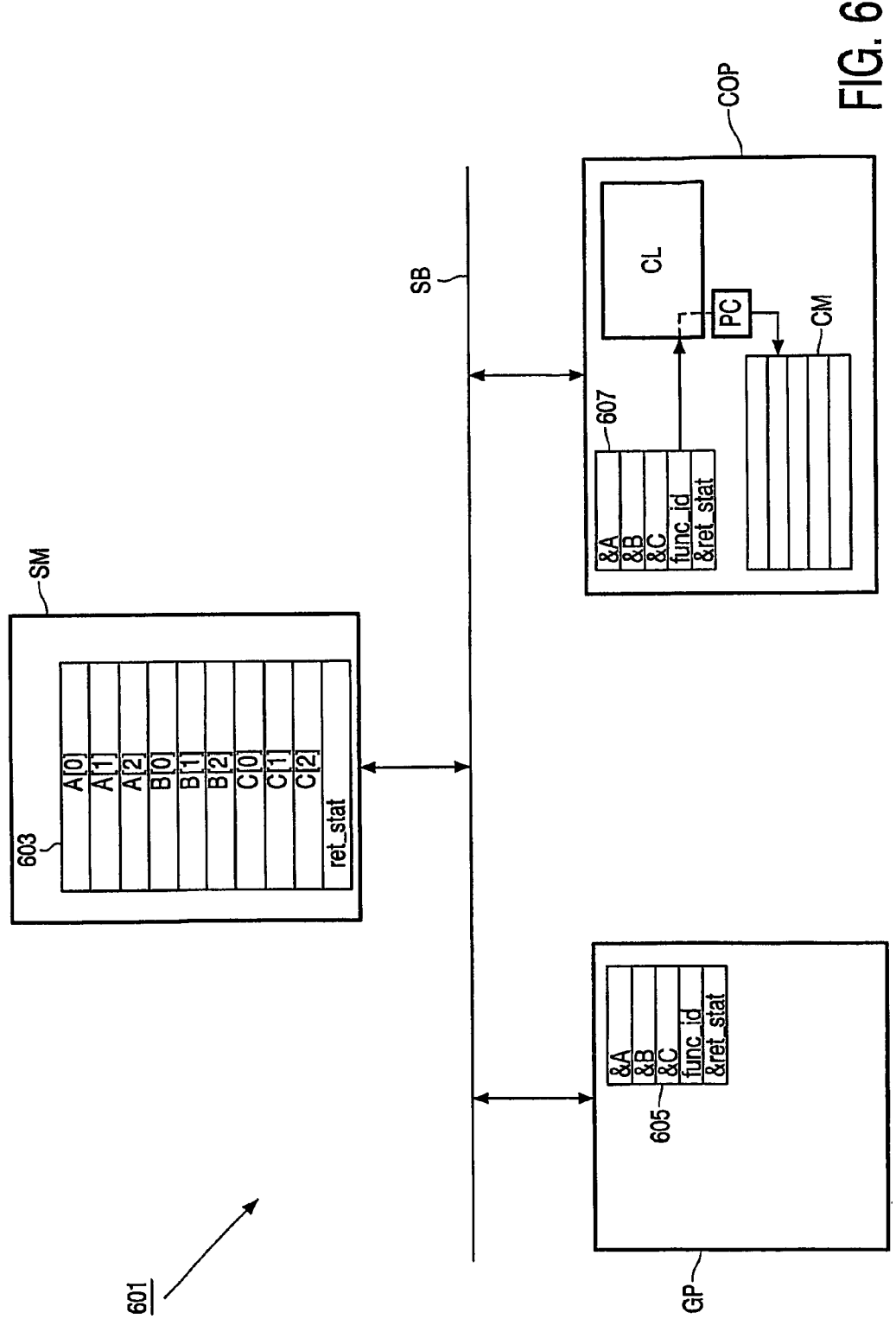
FIG. 6 shows a first target system produced by a co-design method according to the invention.

Referring to FIG. 6, a target system 601 is shown as designed with a co-design method according to an embodiment of the invention. The target system comprises a system memory SM, a general-purpose processor GP, a co-processor COP and a system bus SB. The system memory SM, the general-purpose processor GP and the co-processor COP are coupled via the system bus SB. In an alternative embodiment, the co-processor COP and the system memory SM are directly coupled. In yet anther embodiment, the general-purpose processor GP and the co-processor COP are directly coupled. The system memory SM comprises a plurality of memory registers 603. The general-purpose processor GP comprises a register file 605. The co-processor COP comprises a register file 607, a configuration memory CM, a control logic CL and a program counter PC. After partitioning the specification, a number of functions is implemented by the co-processor COP. The co-processor COP is configured by the configuration memory CM to perform these functions. Functionality implemented by the co-processor COP in this embodiment is a vector addition:

$C[i]=A[i]+B[i]$ wherein A, B and C refer to the three vectors involved and i refers to an array index.

In this embodiment, the co-processor is a configurable processor, for example a Field Programmable Gate Array (FPGA). In other embodiments, the co-processor is a programmable processor, for example a Very Large instruction Word (VLIW) processor or an Application Specific Integrated Processor (ASIP), or the co-processor comprises an Application Specific IC (ASIC).

The general-purpose processor GP starts executing the application. At the moment the general-purpose processor GP wants to switch control to the co-processor COP, it makes a remote function call. For example, in case the vector addition program should be executed. During the remote function call the following parameters are passed to the co-processor COP:

func_id: identifier of the vector addition function in the co-processor COP.
&A, &B, &C: addresses in the system memory SM of the three vectors involved in the computation.
&ret_stat: address in the system memory SM of the variable that will store the return status of the function executed by the co-processor COP.

Prior to the remote function call, all parameters are stored in the register file 605 of the general-purpose processor GP. During the remote function call, these parameters are passed to the co-processor COP. In this embodiment these parameters are written into the register file 607, via a direct connection between the general-purpose processor GP and a port of the co-processor COP, not shown in FIG. 6. In some embodiments, the co-processor COP can read these parameters from memory, in a pre-defined virtual register file. In other embodiments, the general-purpose processor GP can write these parameters directly into the register file 607 via memory-mapped IO.

The func_id parameter stored in the register file 607 of the co-processor COP is read by control logic CL and translated into a program counter PC that points to the first configuration of the vector addition program in the configuration memory CM. In case the vector addition does not fit into a single configuration, larger computations might require multiple configurations that are changed at run-time. In this case the program counter PC will point to the first configuration of the set.

The co-processor COP accesses the system memory SM independently of the general-purpose processor GP, via the system bus SB. The values of the vectors A and B are read from the corresponding registers of the plurality of memory registers 603 of the system memory SM. The vector addition program is executed by the co-processor COP, using the values of A and B. After execution, the calculated value of C is written to the corresponding memory registers of the plurality of memory registers 603 by the co-processor COP, via the system bus SB. The value of variable ret_stat is also written to the corresponding memory register of the plurality of memory registers 603 by the co-processor COP, using the address of the variable ret_stat as stored in register file 607. Synchronization means, not shown in FIG. 6, are provided so that the co-processor COP can signal to the general-purpose processor GP it has completed it task, for example by means of an interrupt. Subsequently the general-purpose processor GP can read the value of the parameter ret_stat from the corresponding memory register of the plurality of memory registers 603 of the system memory SM, via the system bus SB. Using the value of ret_stat the general-purpose processor GP can determine at which point it should continue its execution and actually resumes executing the application or task.

Figure 7:
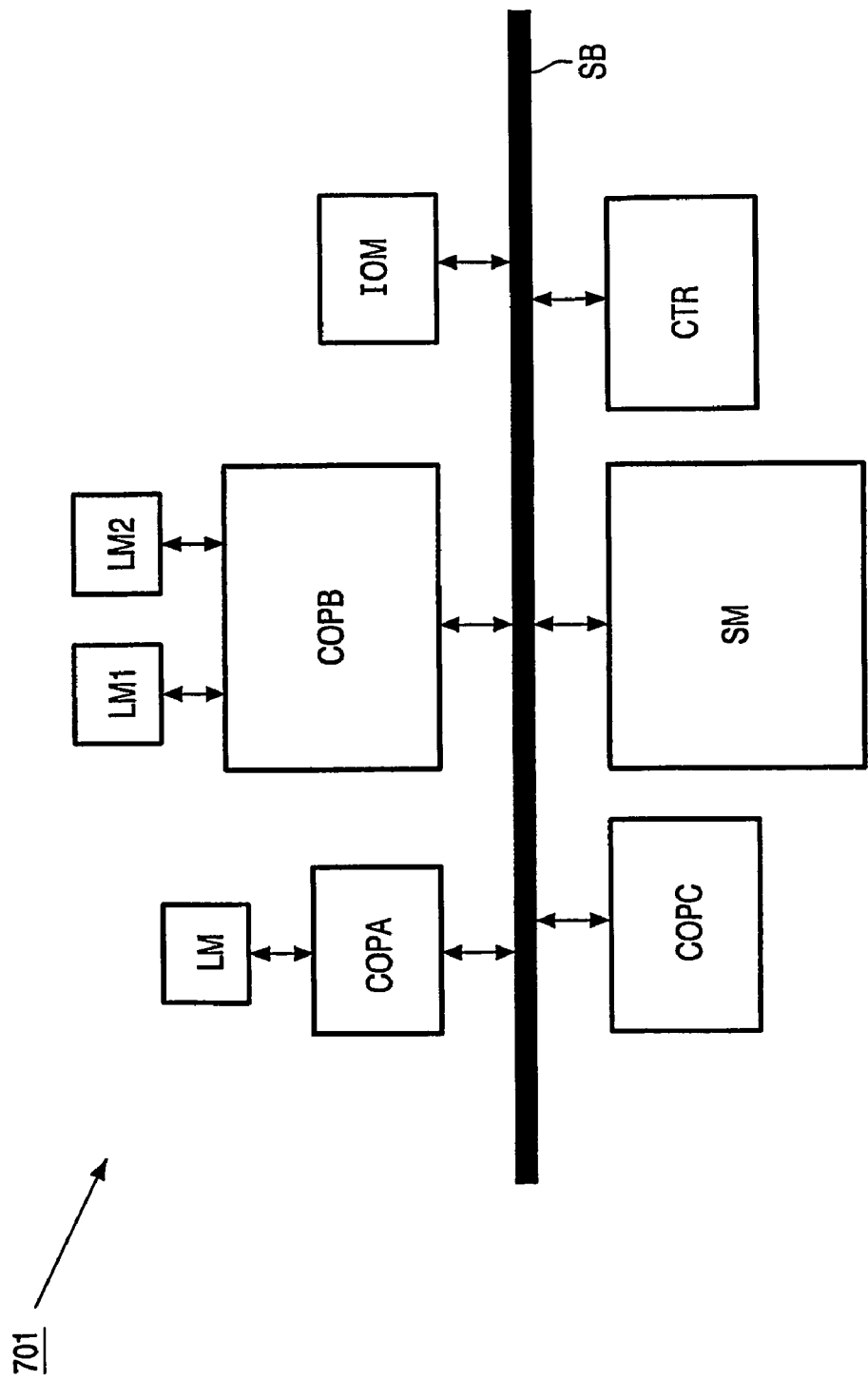
FIG. 7 shows a second target system produced by a co-design method according to the invention.

Referring to FIG. 7, a target system 701 is shown as designed with a co-design method according to an embodiment of the invention. The target system comprises a system memory SM, a control processor CTR, co-processors COPA, COPB and COPC, a system bus SB, an input/output (IO) module IOM, and local memories LM, LM1 and LM2. The system memory SM, co-processors COPA, COPB and COPC, the control processor CTR and the input/output module IOM are coupled via the system bus SB. In an alternative embodiment, the communication between the different parts of the target system is arranged via a data-driven communication network based on blocking First-In-First-Out buffers. Co-processor COPA is coupled to local memory LM, and co-processor COPB is coupled to local memories LM1 and LM2. Standard system control tasks, like handling an operating system, interrupts as well as a user interface, are mapped onto the control processor CTR. Applications that require a relatively high performance, for example media coding/decoding applications like MPEG or MP3, are mapped onto the co-processors COPA, COPB and COPC. The co-processors COPA, COPB and COPC are processors that are capable of performing a number of operations in parallel, for example a Very Large Instruction Word (VLIW) processor or a superscalar processor. These types of processors comprise a number of issue slots, where each issue slot is corresponding to one or more functional units. The data path is controlled by a set of control words. Each control word controls parts of the data path and these parts may comprise register addresses and operation codes for arithmetic logical units or other functional units. Each set of instructions generates a new set of control words, usually by means of an instruction decoder that translates the binary format of the instruction into the corresponding control word, or by means of a micro store, i.e. a memory that contains the control words directly. Typically, a control word represents a RISC like operation, comprising an operation code, two operand register indices and a result register index. The operand register indices and result register indices refer to registers in a register file. In case of a VLIW processor, multiple instructions are packaged into one long instruction, a so-called VLIW instruction. A VLIW processor uses multiple, independent functional units to execute these multiple instructions in parallel. The processor allows exploiting instruction-level parallelism in programs and thus executing more than one instruction at a time. In this embodiment, the co-processors COPA, COPB and COPB comprise a different number of issue slots, i.e. co-processor COPA comprises five issue slots, co-processor PROCB comprises fifteen issue slots and co-processor COPC comprises eight issue slots. These co-processors are therefore capable of handling functions with a different level of instruction-level parallelism. As an example, an MPEG coding/decoding application is mapped onto coprocessors COPA, COPB and COPC. The MPEG application consists of several different functions, i.e. a Discrete Cosine Transform (DCT) function, a quantization function and a motion estimation function. The MPEG application is partitioned across the co-processors COPA, COPB and COPC using a method for partitioning a specification according to the invention. The motion estimation function is mapped onto co-processor COPB, since this function contains inherent a large degree of instruction-level parallelism. The motion estimation is carried out across at least two different frames in a video sequence, and these two frames can be stored in local memories LM1 and LM2, respectively. The DCT function has inherent instruction-level parallelism and requires a low amount of local memory storage, and is therefore mapped onto co-processor COPC. The quantization function is an inherently sequential function, i.e. having no instruction-level parallelism. It does require a look-up table that is optimally stored in a local memory, reducing the number of system bus transactions. Therefore the quantization function is optimally mapped onto co-processor COPA. After partitioning the MPEG application, the parts that are mapped onto each specific co-processor can be separately converted into a specification of that co-processor, using a dedicated tool. As a result, an optimal design of the target system 701 for handling the MPEG application is obtained.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for partitioning a specification in a source code; characterized in that the method comprises the following steps:
    first converting the specification into a plurality of abstract syntax trees;
    partitioning the plurality of abstract syntax trees into at least a first set and a second set of abstract syntax trees, wherein the step of partitioning comprises a step of out-lining at least one abstract syntax tree of the first set of abstract syntax trees based on profile data as input data and replacing said abstract syntax tree by a function call to a function present as an abstract syntax tree in the second set of abstract syntax trees;
    implementing the first set of abstract syntax trees by a first processor and implementing the second set of abstract syntax trees by a second processor;
    defining an interface between the first processor and the second processor, wherein the interface comprises a remote function call, the remote function call having a set of parameters, the set of parameters comprising an identifier for the function to be called, at least one reference pointing to the input data of the function to be called, at least one reference pointing to the result data of the function to be called, and a reference pointing to a memory location used for storing information on the return status of the function to be called; and
    second converting, after the partitioning step, the first set of abstract syntax trees and the second set of abstract syntax trees back to source code, thereby facilitating editing of a resulting specification in the source code, wherein the second converting step comprises converting the first set of abstract syntax trees to a first partial specification in the source code and converting the second set of abstract syntax trees to a second partial specification in the source code.

2. A method for partitioning a specification in a source code according to claim 1, wherein the second processor is a co-processor.

3. A method for partitioning a specification in a source code according to claim 2, wherein the first processor is a general-purpose processor.

4. A method for partitioning a specification in a source code according to claim 1 wherein the step of partitioning the abstract syntax trees into a first set of abstract syntax trees and a second set of abstract syntax trees comprises a step of out-lining at least one abstract syntax tree of the first set of abstract syntax trees based on programmer provided information and replacing said abstract syntax tree by a function call to a function present as an abstract syntax tree in the second set of abstract syntax trees.

5. A co-design method for producing a target system wherein the target system comprises a first processor and at least a second processor;
    the co-design method comprising the method for partitioning a specification in a source code according to claim 1.

6. A co-design method for producing at target system according to claim 5, wherein the second converting step of the method for partitioning a specification in a source code comprises converting the first set of abstract syntax trees to a first partial specification in the source code and converting the second set of abstract syntax trees to a second partial specification in the source code.

7. A co-design method for producing a target system according to claim 6 wherein the second processor is a co-processor and wherein the second partial specification is converted to a specification of the co-processor.

8. A co-design method for producing a target system according to claim 7, wherein the first processor is a general-purpose processor and wherein the first partial specification is converted to object code by means of a compiler.

9. A co-design method for producing a target system according to claim 8, further comprising a step for defining an interface between the general-purpose processor and the co-processor.

10. A co-design method according to claim 7, wherein the specification of the co-processor comprises a specification of an ASIC.

11. A co-design method according to claim 7, wherein the specification of the co-processor comprises a specification of a programmable processor.

12. A co-design method according to claim 7, wherein the specification of the co-processor comprises a specification of a reconfigurable processor.

13. A co-design method according to claim 9, wherein the interface between the general-purpose processor and the co-processor comprises a remote function call;

the remote function call having a set of parameters;

the set of parameters comprising an identifier for the function to be called, at least one reference pointing to the input data of the function to be called and at least one reference pointing to the result data of the function to be called.

14. A co-design method according to claim 13 wherein the set of parameters of the remote function call further comprises a reference to a memory location used for storing information on the return status of the function to be called.

15. A co-design method according to claim 5 wherein the target system further comprises a system memory and a system bus;

the system memory, the first processor and the second processor being coupled by the system bus.

16. A co-design method according to claim 8 wherein the general-purpose processor is a digital signal processor.

* * * * *